(12) United States Patent  
Liu

(10) Patent No.: US 9,154,183 B2  
(45) Date of Patent: Oct. 6, 2015

(54) METHOD AND APPARATUS FOR CHANNEL MAPPING BASED ON FREQUENCY HOPPING

(71) Applicant: Huawei Technologies Co., Ltd., Shenzhen (CN)

(72) Inventor: Pei Liu, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/510,773

(22) Filed: Oct. 9, 2014

(65) Prior Publication Data

US 2015/0023396 A1    Jan. 22, 2015

Related U.S. Application Data

(63) Continuation of application No. PCT/CN2013/071929, filed on Feb. 27, 2013.

(30) Foreign Application Priority Data

Apr. 9, 2012    (CN) .......................... 2012 1 0101770

(51) Int. Cl.
| | |
|---|---|
| *H04B 1/713* | (2011.01) |
| *H04B 1/715* | (2011.01) |
| *H04B 1/7156* | (2011.01) |
| *H04L 5/00* | (2006.01) |
| *H04B 1/7143* | (2011.01) |

(52) U.S. Cl.  
CPC .............. *H04B 1/715* (2013.01); *H04B 1/7143* (2013.01); *H04B 1/7156* (2013.01); *H04L 5/0012* (2013.01); *H04B 2001/7154* (2013.01)

(58) Field of Classification Search  
CPC ... H04W 84/18; H04W 24/02; H04W 56/002; H04L 5/0037; H04L 5/0012; H04B 1/7143  
USPC .................................................. 375/132–137  
See application file for complete search history.

(56) References Cited

U.S. PATENT DOCUMENTS

| | | | |
|---|---|---|---|
| 5,940,431 | A | 8/1999 | Haartsen et al. |
| 2007/0258508 | A1* | 11/2007 | Werb et al. .................... 375/140 |
| 2010/0226342 | A1* | 9/2010 | Colling et al. ................ 370/336 |
| 2012/0014414 | A1 | 1/2012 | Jeong et al. |
| 2012/0213062 | A1 | 8/2012 | Liang et al. |

FOREIGN PATENT DOCUMENTS

| | | |
|---|---|---|
| CN | 1247654 A | 3/2000 |
| CN | 101286932 A | 10/2008 |
| CN | 102036286 A | 4/2011 |

(Continued)

OTHER PUBLICATIONS

Cheng, et al., "A new GTS allocation scheme for IEEE 802.15.4 networks with improved bandwidth utilization," Date of Conference Oct. 17-19, 2007, 6 pages.

*Primary Examiner* — Don N Vo  
(74) *Attorney, Agent, or Firm* — Slater & Matsil, L.L.P.

(57) ABSTRACT

A method can be used for channel mapping based on frequency hopping. A working channel label of a node is computed according to the number of working channels of the node in frequency hopping mode, an identifier of the node, and a time parameter corresponding to a current superframe. A working channel is determined according to the working channel label. Data is transmitted on the working channel within the current superframe.

11 Claims, 4 Drawing Sheets

(56) References Cited

FOREIGN PATENT DOCUMENTS

| CN | 102122973 A | 7/2011 |
|---|---|---|
| CN | 102332936 A | 1/2012 |
| CN | 102624510 A | 8/2012 |
| EP | 2496046 A1 | 9/2012 |
| WO | 0111795 A1 | 2/2001 |
| WO | 2011082554 A1 | 7/2011 |
| WO | 2013155901 A1 | 10/2013 |

\* cited by examiner

| Octet: | 1 | 4/10 | /10/14 | 2 | Variable | Variable | Variable | 2 |
|---|---|---|---|---|---|---|---|---|
| | Frame control | Sequence number | addressing fields | Auxiliary security header | Definition of superframe | Field of guaranteed timeslot (GTS) | Field of address to be processed | Beacon payload | Frame check sequence (FCS) |
| | Frame header (MHR) | | | | MAC payload | | | Frame footer (MFR) |

METHOD AND APPARATUS FOR CHANNEL MAPPING BASED ON FREQUENCY HOPPING

This application is a continuation of International Application No. PCT/CN2013/071929, filed on Feb. 27, 2013, which claims priority to Chinese Patent Application No. 201210101770.6, filed on Apr. 9, 2012, both of which are hereby incorporated by reference in their entireties.

TECHNICAL FIELD

The present embodiments of the invention relate to the field of communications technologies and, in particular embodiments, to a method and apparatus for channel mapping based on frequency hopping.

BACKGROUND

Micropower wireless communications networks and systems work in an unauthorized frequency band and are exposed to relatively strong interference, which often results in relatively poor communication quality and poor performance in actual application.

In the prior art, a technology of frequency hopping is used to resolve a problem of interference in a network.

Specifically, according to a protocol, a whole communication band is divided into at least two working channels. After the technology of frequency hopping is used, a network and a device can switch between different working channels according to a frequency hopping pattern and a frequency hopping sequence, that is, working channels of the network and device are changed. In this way, all nodes included in the network work on a same channel in a channel hopping cycle. When the network performs frequency hopping, all nodes in the network also perform frequency hopping synchronously, that is, working channels of the network are changed.

In a process in which the foregoing channel frequency hopping is implemented, when all nodes in the network are working on a same channel and the channel is exposed to interference, performance of all nodes in the network is degraded, which further leads to great degradation of network performance.

SUMMARY

Embodiments of the present invention provides a method and an apparatus for channel mapping based on frequency hopping, so that all nodes in a network are working on multiple channels, which avoids performance degradation of all nodes when one of these channels is interfered and reduces impact on network performance.

To achieve the foregoing objectives, embodiments of the present invention use the following technical solutions.

A method can be used for channel mapping based on frequency hopping. A working channel label of a node is computed according to the number of working channels of the node in frequency hopping mode, an identifier of the node, and a time parameter corresponding to a current superframe. A working channel is determined according to the working channel label. Data is transmitted on the working channel within the current superframe.

An apparatus can be used for channel mapping based on frequency hopping. A computing unit is configured to compute a working channel of a node according to the number of working channels of the node in frequency hopping mode, an identifier of the node, and a time parameter corresponding to a current superframe. A determining unit is configured to determine a working channel according to the working channel label. An executing unit is configured to transmit data on the working channel within the current superframe.

In the method and apparatus for channel mapping based on frequency hopping, after the foregoing solutions are used, all nodes in a network are working on multiple channels. This avoids performance degradation of all nodes when one channel is interfered, thereby reducing impact on network performance.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

Figures 1, 2:
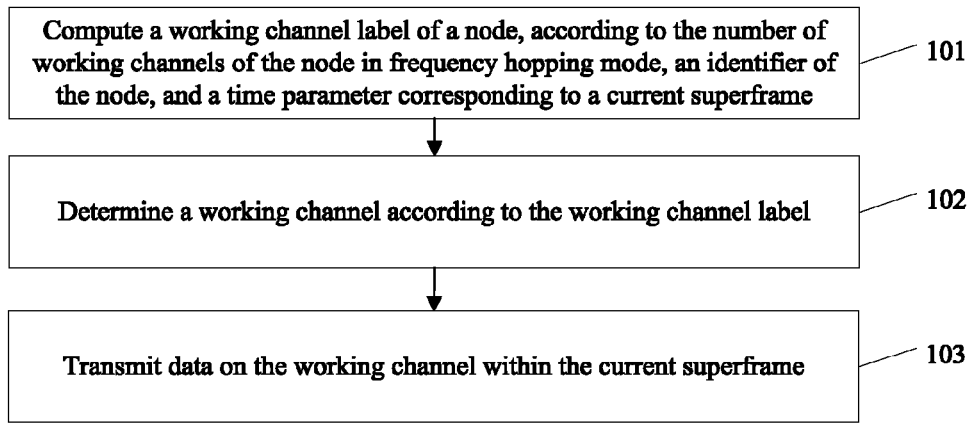
FIG. 1 is a flowchart of a method for channel mapping based on frequency hopping according to an embodiment of the present invention.
FIG. 2 is a schematic diagram of a beacon frame format according to an embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the embodiments of the present invention.

To describe the following embodiments more clearly, an issue of using a technology of frequency hopping to cope with interference in a network is briefly described first.

The following embodiments may be used in a frequency hopping communication system, and the frequency hopping communication system is based on superframe synchronization and has multiple devices and channels.

The embodiments do not limit the frequency hopping communication system. The frequency hopping communication system may be any frequency hopping communication system that is well known by a person skilled in the art and meets the foregoing conditions, for example, a micropower wireless communications system, and details are not described herein again.

The embodiments do not limit a superframe synchronization method, the method may be well known by a person skilled in the art and details are not described herein again.

In an embodiment, a micropower wireless communications system mainly works in a 433 MHz band and a 470-510 MHz t band, and its nodes are distributed in a densely populated area, or in complex and changeable cell electromagnetic environments. The bands are exposed to unpredictable interference such as automotive electronics and mutual interference between neighboring networks, which poses a great challenge to data exchange reliability.

According to a protocol, an operating band of 470 MHz to 510 MHz is divided into multiple working channels, with each working channel working in different sub-bands. In the case that frequency hopping is supported, a network and a device are allowed to perform frequency hopping on these channels, so as to reduce burst interference. In a structure with multiple superframes, a specific frequency hopping method is to allow the network to perform synchronous frequency hopping during a CFP period according to a certain frequency hopping pattern or frequency hopping sequence.

The embodiments do not limit an operating band, and an operating band may be set according to actual requirements, and details are not described herein again.

In the prior art, when a working channel to which nodes are mapped is greatly interfered, the nodes mapped to the channel are interfered. As all nodes are allocated a same working channel, all the nodes in the network are interfered, which greatly degrades network performance. Embodiments of the present invention may effectively avoid the foregoing problem.

The frequency hopping pattern or frequency hopping sequence according to the embodiments provide a basis for frequency hopping by nodes. Frequency hopping is a technology well known to a person skilled in the art and details are not described herein again.

In the prior art, as all nodes in a network are allocated a same channel, when the channel is greatly interfered, performance of all nodes in the network is degraded, which further leads to great degradation of network performance.

To solve the foregoing problem, an embodiment provides a method for channel mapping based on frequency hopping. As shown in FIG. 1, the method may include the following steps.

101. Compute a working channel label of a node according to the number of working channels of the node in frequency hopping mode, an identifier of the node, and a time parameter corresponding to a current superframe.

A superframe includes three parts: a BP (beacon period), an active period, and an inactive period, where the inactive period is a dormant phase. A node enters a dormant state during the inactive period, so as to save power. A network carries out communication during the active period. The active period may be further divided into a CAP (contention access period) and a CFP (contention free period).

The BP period is used to synchronize nodes in a network and broadcast a part of network messages. A network coordinator broadcasts beacon frames. A specific format of a beacon frame is shown in FIG. 2, where a sequence number is a value that identifies a superframe and its initialization is a random number. Each time when a beacon frame is generated, the superframe sequence number is increased by 1. A sequence number may be used cyclically.

In FIG. 2, a beacon frame includes an MHR (Medium Access Control header, MAC header), a GTS (guaranteed timeslot), an MFR (MAC footer), MAC (medium access control), and an FCS (frame check sequence).

To avoid interference to all nodes on a working channel when the working channel is greatly interfered, a coordinator allocates nodes in the network to work on least two working channels and ensures that a relatively small number of nodes are on a working channel, thereby reducing the number of interfered nodes when a channel is interfered.

Specifically, the coordinator computes a working channel label according to the number of working channels of a node in frequency hopping mode, an identifier of the node, and a time parameter corresponding to a current superframe.

102. Determine a working channel according to the working channel label.

The coordinator allocates a working channel corresponding to the working channel label as a working channel of the node.

103. Transmit data on the working channel within the current superframe.

After nodes in the network are allocated to at least two working channels, the nodes use the allocated working channels to transmit data, that is, the nodes transmit data on the working channels. In this way, the network may solve the problem of interference by using the frequency hopping technology, and in addition, the number of interfered nodes is reduced when a channel is interfered, thereby reducing network performance degradation.

After the foregoing solution is used, all nodes in a network work on multiple channels, which avoids performance degradation of all nodes when one of these channels is interfered, thereby reducing impact on network performance.

Figure 3:
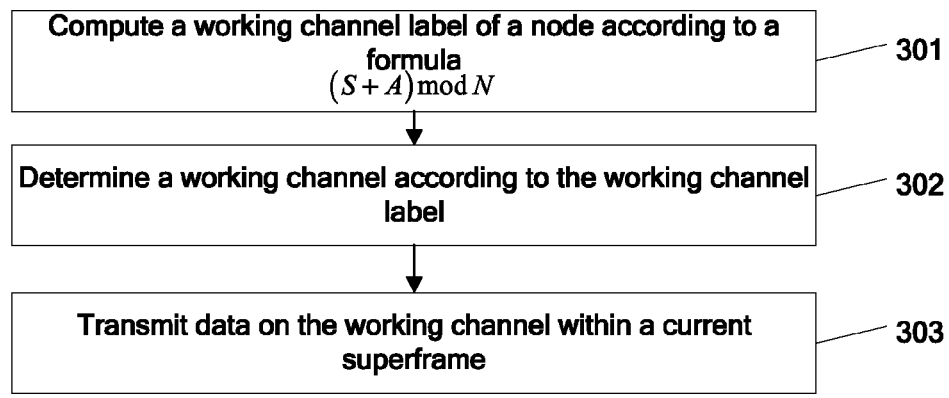
FIG. 3 is a flowchart of a method for channel mapping based on frequency hopping according to an embodiment of the present invention, where the method is executed to map a node to all channels in a network.

Another embodiment provides another method for channel mapping based on frequency hopping. With this method, working channels that may be allocated to a node are all channels in a network. As shown in FIG. 3, the method may include the following steps.

301. Compute a working channel label of a node according to a formula (S+A)mod N.

In an implementation of this embodiment, in a micropower wireless communications network, especially a micropower wireless meter reading system and a smart household system, operating bands are mainly at 433 MHz or 470 MHz to 510 MHz, and are exposed to a large amount of unpredictable interference such as interference between neighboring networks and automotive electronics.

To avoid interference to all nodes on a working channel when the working channel is greatly interfered, a coordinator allocates nodes in the network to work on least two working channels and ensures that a relatively small number of nodes are on any working channel, thereby reducing the number of interfered nodes when a channel is interfered.

Figure 4:
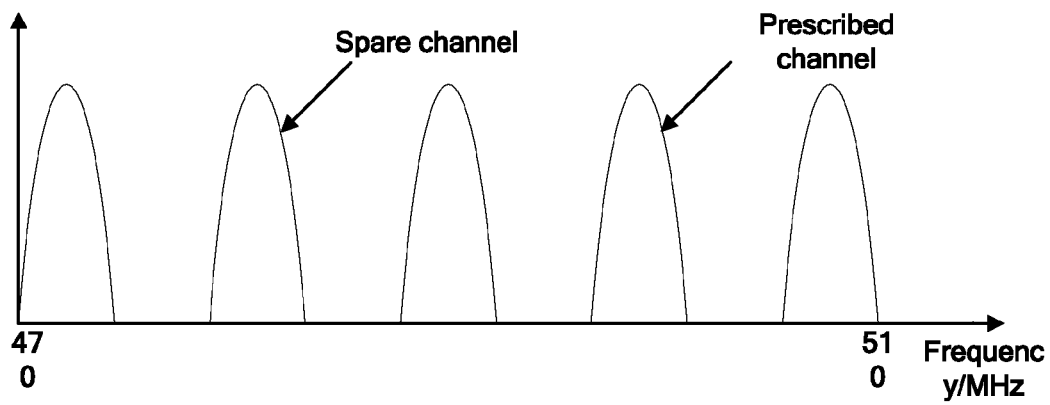
FIG. 4 is a schematic diagram of channel division in a network according to an embodiment of the present invention.

As a network based on micropower wireless meter reading uses a star topology, the network is strictly synchronous in the time domain, that is, all nodes in the entire network implement synchronization and resource allocation based on a superframe structure. In addition, different network addresses are allocated to nodes in the network when the nodes access the Network. In an operating band of 470 MHz to 510 MHz, as shown in FIG. 4, a standard protocol divides the whole band into multiple channels according to channel bandwidth, where a prescribed channel is used to transmit public data, and a spare channel is a backup channel of a prescribed channel.

Specifically, the coordinator computes a working channel label according to the number of working channels of a node in frequency hopping mode, an identifier of the node, and a time parameter corresponding to a current superframe. In addition, by using this method, working channels of each node are determined by performing computation according to existing parameters without signaling notifications, and consequently there is no increase in network overhead.

When each node in a network initially accesses the network, the network allocates a network address to the node, and the network address is used by the node to communicate in the network. For a same network, an address of each node in the network is random and unique.

Further, optionally, the working channel label of the node is computed according to a formula $(S+A) \bmod N$. In this formula S is the time parameter corresponding to the current superframe, A is the identifier of the node, and N is the number of working channels of the node in frequency hopping mode.

Further, the time parameter corresponding to the current superframe may be a sequence number of the current superframe, and the identifier of the node may be a value of a network address of the node.

In an implementation of this embodiment, when S=1, A=255263, and N=9, the working channel label computed according to the formula $(S+A) \bmod N$ is 6, where mod is a remainder.

As network addresses of nodes are different and random, nodes in a network are allocated randomly and evenly to channels. Further, as a sequenced number of each superframe is changing, a working channel of each node also performs frequency hopping within different superframes, which may overcome random interference and burst interference more effectively. In addition, as parameters in all formulas are known and do not need to be exchanged or updated through signaling, network overheads are saved.

This embodiment does not limit values of S, A, and N, and the values may be set depending on actual requirements, and details are not described herein again.

Further, optionally, A in the foregoing formula may be the value of a 16-bit short address.

If the network allocates network addresses to nodes by using another network protocol, values of network addresses allocated in this manner are used as values of network addresses of the nodes.

302. Determine a working channel according to the working channel label.

The coordinator determines a working channel according to the working channel label, that is, the coordinator allocates a working channel corresponding to the working channel label as the working channel of the node.

Further, optionally, N may be the number of all working channels of a node in a network in frequency hopping mode or the number of other working channels of a node in frequency hopping mode than spare channels and prescribed channels in a network.

In an implementation of this embodiment, if N is the number of all working channels of a node in a network in frequency hopping mode, when the working channel label computed according to the formula $(S+A) \bmod N$ in step 302 is 6, a working channel corresponding to the working channel label 6 is allocated as a working channel of the node.

303. Transmit data on the working channel within the current superframe.

After nodes in the network are allocated to at least two working channels, the nodes use the allocated working channels to transmit data, that is, the nodes transmit data on the working channels. In this way, the network may solve the problem of interference by using the frequency hopping technology, and in addition, the number of interfered nodes is reduced when a channel is interfered, thereby reducing network performance degradation.

After the foregoing solution is used, all nodes in a network work on multiple channels, which avoids performance degradation of all nodes when one of these channels is interfered, thereby reducing impact on network performance. In addition, a node determines a working channel according to known parameters without signaling notifications, and consequently there is no increase in network overhead.

Figure 5:
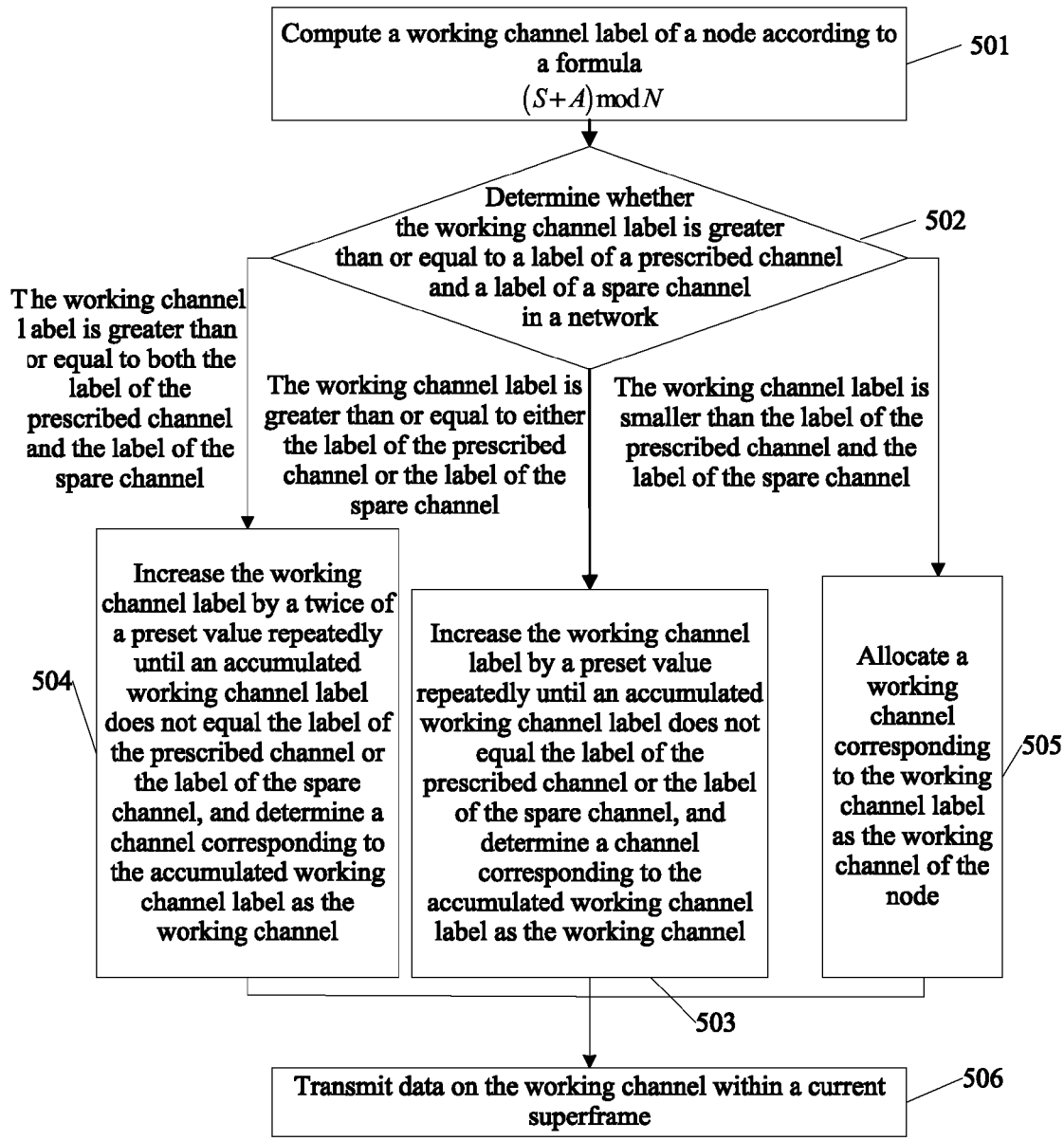
FIG. 5 is a flowchart of a method for channel mapping based on frequency hopping according to an embodiment of the present invention, where the method is executed to map a node to another channel in a network than a prescribed channel and a spare channel.

There are prescribed channels and spare channels in a network. An embodiment provides another method for channel mapping based on frequency hopping. According to this method, a node is not mapped to a prescribed channel or a spare channel. As shown in FIG. 5, the method may include the following steps.

501. Compute a working channel label of a node according to a formula $(S+A) \bmod N$.

In an implementation of this embodiment, in a micropower wireless communications network, especially a micropower wireless meter reading system and a smart household system, operating bands are mainly at 433 MHz or 470 MHz to 510 MHz, and are exposed to a large amount of unpredictable interference such as interference between neighboring networks and automotive electronics.

To avoid interference to all nodes on a working channel when the working channel is greatly interfered, a coordinator allocates nodes in the network to work on least two working channels and ensures that a relatively small number of nodes are any working channel, thereby reducing the number of interfered nodes when a channel is interfered.

As a network based on micropower wireless meter reading uses a star topology, the network is strictly synchronous in the time domain, that is, all nodes in the entire network implement synchronization and resource allocation based on a superframe structure. In addition, different network addresses are allocated to nodes in the network when the nodes access the network. In an operating band of 470 MHz to 510 MHz, as shown in FIG. 4, a standard protocol divides the whole band into multiple channels according to channel bandwidth, where a prescribed channel is used to transmit public data, and a spare channel is a backup channel of a prescribed channel.

Specifically, the coordinator computes a working channel label according to the number of working channels of a node in frequency hopping mode, an identifier of the node, and a time parameter corresponding to a current superframe. In addition, by using this method, working channels of each node are determined by performing computation according to existing parameters without signaling notifications, and consequently there is no increase in network overhead.

When each node in a network initially accesses the network, the network allocates a network address to the node, and the network address is used by the node to communicate in the network. For a same network, an address of each node in the network is random and unique.

Further, optionally, the working channel label of the node is computed according to a formula $(S+A) \bmod N$.

S is the time parameter corresponding to the current superframe; A is the identifier of the node; and N is the number of other working channels of the node in frequency hopping mode than a spare channel and a prescribed channel in the network.

Further, the time parameter corresponding to the current superframe may be a sequence number of the current superframe, and the identifier of the node may be a value of a network address of the node.

As network addresses of nodes are different and random, nodes in a network are allocated randomly and evenly to channels. Further, as a sequenced number of each superframe is changing, a working channel of each node also performs frequency hopping within different superframes, which may overcome random interference and burst interference more effectively. In addition, as parameters in all formulas are known and do not need to be exchanged or updated through signaling, network overheads are saved.

Further, optionally, A in the foregoing formula may be the value of a 16-bit short address.

If the network allocates network addresses to nodes by using another network protocol, values of network addresses allocated in this manner are used as values of network addresses of the nodes.

502. Determine whether the working channel label is greater than or equal to a label of a prescribed channel and a label of a spare channel in the network.

In an implementation of this embodiment, in the embodiment, as N does not include the number of prescribed channels and spare channels, nodes are not allocated to prescribed channels or spare channels, so that prescribed channels and spare channels may be used to transmit public data.

When a working channel label computed according to the formula (S+A)mod N is a label of a prescribed channel or a label of a spare channel, a channel corresponding to the working channel label cannot be queried. As a result, channel allocation fails. To avoid an allocation failure due to the foregoing reason, the coordinator checks whether the working channel label is greater than or equal to a label of a prescribed channel or a label of a spare channel in the network.

If the working channel label is greater than or equal to either a label of a prescribed channel or a label of a spare channel, perform step 503 and step 506; if the working channel label is greater than or equal to both a label of a prescribed channel and a label of a spare channel, perform step 504 and step 506; if the working channel label is smaller than both a label of a prescribed channel and a label of a spare channel, perform step 505 and step 506.

503. Increase the working channel label by a preset value repeatedly until an accumulated working channel label does not equal the label of the prescribed channel or the label of the spare channel, and determine a channel corresponding to the accumulated working channel label as the working channel.

The preset value is a difference between labels of neighboring working channels in the network.

In an implementation of this embodiment, the working channel label is an integer that is greater than or equal to 0 and the difference between labels of neighboring working channels is 1, a label of a prescribed channel is 3, and a label of a spare channel is 6, that is, the preset value is 1. When the working channel label computed according to the formula (S+A)mod N is 4, as 4 is greater than 3, that is, the computed working channel label is greater than a label of a prescribed channel, and N does not include the number of prescribed channels and spare channels, the computed working channel label 4 is actually corresponding to a channel whose label is 5. In this case, increase the computed working channel label 4 by 1 and allocate a working channel whose label is 5 as the working channel.

In an implementation of this embodiment, the working channel label is an integer that is greater than or equal to 0 and the difference between labels of neighboring working channels is 1, a label of a prescribed channel is 3, and a label of a spare channel is 6, that is, the preset value is 1. When the working channel label computed according to the formula (S+A)mod N is 5, as 5 is greater than 3, the computed working channel label 5 is actually corresponding to a channel whose label is 6. In this case, increase the computed working channel label 5 by 1. Further, as a label of a spare channel is 6, the computed working channel label is actually corresponding to a channel whose label is 7. In this case, increase the working channel label 6 by 1, that is, allocate a working channel whose label is 7 as the working channel.

This embodiment does not limit the preset value or channel labels, which may be set according to actual requirements, for example, the preset value may be 1, 2, or 3, and details are not described herein again.

504. Increase the working channel label by a twice of the preset value repeatedly until an accumulated working channel label does not equal the label of the prescribed channel or the label of the spare channel, and determine a channel corresponding to the accumulated working channel label as the working channel.

In an implementation of this embodiment, the working channel label is an integer that is greater than or equal to 0 and the difference between labels of neighboring working channels is 1, a label of a prescribed channel is 3, and a label of a spare channel is 6, that is, the preset value is 1. When the working channel label computed according to the formula (S+A)mod N is 6, as 6 is a label of a spare channel, the computed working channel label 6 is actually corresponding to a channel whose label is 8. In this case, increase the computed working channel label 6 by a twice of 1, that is, the working channel label is 8, and allocate a working channel whose label is 8 as the working channel.

505. Allocate a working channel corresponding to the working channel label as a working channel of the node.

In an implementation of this embodiment, in step 501, as the working channel label computed according to the formula (S+A)mod N is 6, a working channel whose label is 6 is allocated as a working channel of the node.

506. Transmit data on the working channel within the current superframe.

After nodes in the network are allocated to at least two working channels, the nodes use the allocated working channels to transmit data, that is, the nodes transmit data on the working channels. In this way, the network may solve the problem of interference by using the frequency hopping technology, and in addition, the number of interfered nodes is reduced when a channel is interfered, thereby reducing network performance degradation.

After the foregoing solution is used, all nodes in a network work on multiple channels, which avoids performance degradation of all nodes when one of these channels is interfered, thereby reducing impact on network performance. In addition, a node determines a working channel according to known parameters without signaling notifications, and consequently there is no increase in network overhead.

Figure 6:
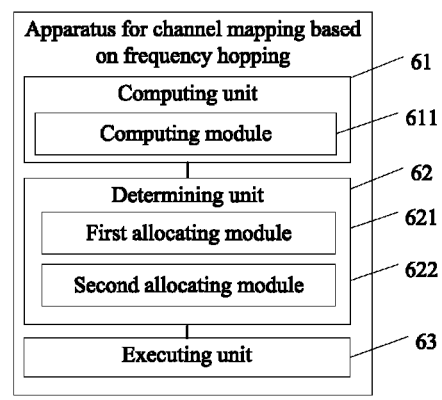
FIG. 6 is a structural schematic diagram of an apparatus for channel mapping based on frequency hopping according to an embodiment of the present invention.

An embodiment provides an apparatus for channel mapping based on frequency hopping, which may be but is not limited to a coordinator. As shown in FIG. 6, the apparatus includes a computing unit 61, a determining unit 62, and an executing unit 63.

Specifically, the computing unit 61 includes a computing module 611.

The determining unit 62 includes a first allocating module 621 and a second allocating module 622.

The computing unit 61 is configured to compute a working channel label of a node according to the number of working channels of the node in frequency hopping mode, an identifier of the node, and a time parameter corresponding to a current superframe.

Specifically, the computing module 611 is configured to compute a working channel label of a node according to a formula (S+A)mod N, where S is the time parameter corresponding to the current superframe; A is the identifier of the node; and N is the number of working channels of the node in frequency hopping mode.

Further, the time parameter corresponding to the current superframe may be a sequence number of the current superframe, and the identifier of the node may be a value of a network address of the node.

The determining unit 62 is configured to determine a working channel according to the working channel label.

Further, optionally, N may be the number of all working channels of a node in a network in frequency hopping mode or the number of other working channels of a node in frequency hopping mode than spare channels and prescribed channels in a network.

Further, optionally, there are prescribed channels and spare channels in the network. To allow prescribed channels and spare channels to be used to transmit public data, prescribed channels and spare channels are not allocated as working channels of nodes. N may be the number of other working channels than spare channels and prescribed channels in the network.

If N is the number of other working channels of a node in frequency hopping mode than spare channels and prescribed channels in the network, the determining unit further includes first and second allocating modules 621 and 622. The first allocating module 621 is configured to, if the working channel label is greater than or equal to either a label of a prescribed channel or a label of a spare channel, increase the working channel label by a preset value repeatedly until an accumulated working channel label does not equal the label of the prescribed channel or spare channel, and to determine a channel corresponding to the accumulated working channel label as the working channel. The second allocating module 622 is configured to, if the working channel label is greater than or equal to both a label of a prescribed channel and a label of a spare channel, increase the working channel label by a twice of the preset value repeatedly until an accumulated working channel label does not equal the label of the prescribed channel or the label of the spare channel, and determine a channel corresponding to the accumulated working channel label as the working channel.

The preset value is a difference between labels of neighboring working channels in the network.

Further, optionally, A may be the value of a 16-bit short address.

The executing unit 63 is configured to transmit data on the working channel within the current superframe.

After nodes in the network are allocated to at least two working channels, the nodes use the allocated working channels to transmit data, that is, the executing unit transmits data on the working channels. In this way, the network may solve the problem of interference by using the frequency hopping technology, and in addition, the number of interfered nodes is reduced when a channel is interfered, thereby reducing network performance degradation.

After the foregoing solution is used, all nodes in a network work on multiple channels, which avoids performance degradation of all nodes when one of these channels is interfered, thereby reducing impact on network performance. In addition, a node determines a working channel according to known parameters without signaling notifications, and consequently there is no increase in network overhead.

From the foregoing descriptions of the embodiments, a person of ordinary skill in the prior art may clearly understand that the embodiments of the present invention may be implemented by software plus necessary universal hardware, and may also be implemented by hardware. However, the former is preferred implementation. Based on such an understanding, the technical solutions of the embodiments of the present invention essentially, or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the present invention. Therefore, the protection scope of the embodiments of the present invention shall be subject to the protection scope of the claims.

What is claimed is:

1. A method for channel mapping based on frequency hopping, the method comprising:
   computing a working channel label of a node according to a number of working channels of the node in a frequency hopping mode, an identifier of the node, and a time parameter corresponding to a current superframe;
   determining a working channel according to the working channel label; and
   transmitting data on the working channel within the current superframe,
   wherein the number of working channels of the node in the frequency hopping mode is a number of other working channels of the node in the frequency hopping mode than a spare channel and a prescribed channel in a network, and
   wherein determining the working channel according to the working channel label comprises when the working channel label is greater than or equal to either a label of a prescribed channel or a label of a spare channel, increasing the working channel label by a preset value repeatedly until an accumulated working channel label does not equal the label of the prescribed channel or the label of the spare channel, wherein determining a channel corresponding to the accumulated working channel label as the working channel, and wherein the preset value is a difference between labels of neighboring working channels in the network.

2. The method according to claim 1, wherein computing the working channel label of the node comprises computing the working channel label of the node according (S+A) mod N, wherein S is the time parameter corresponding to the current superframe, A is the identifier of the node, and N is the number of working channels of the node in frequency hopping mode.

3. The method according to claim 2, wherein the time parameter corresponding to the current superframe is a sequence number of the current superframe.

4. The method according to claim 3, wherein the identifier of the node is a value of a network address of the node.

5. The method according to claim 2, wherein the identifier of the node is a value of a network address of the node.

6. The method according to claim 1, wherein the working channel label is greater than or equal to both a label of a prescribed channel and a label of a spare channel and wherein determining the working channel according to the working channel label comprises increasing the working channel label by a twice of a preset value repeatedly until an accumulated working channel label does not equal the label of the prescribed channel or the label of the spare channel, and determining a channel corresponding to the accumulated working channel label as the working channel, wherein the preset value is a difference between labels of neighboring working channels in the network.

7. An apparatus for channel mapping based on frequency hopping, the apparatus comprising:
- a computing unit configured to compute a working channel label of a node according to a number of working channels of the node in a frequency hopping mode, an identifier of the node, and a time parameter corresponding to a current superframe;
- a determining unit configured to determine a working channel according to the working channel label; and
- an executing unit configured to transmit data on the working channel within the current superframe, wherein the number of working channels of the node in the frequency hopping mode is a number of other working channels of the node in the frequency hopping mode than a spare channel and a prescribed channel, and wherein the determining unit comprises:
  - a first allocating module, the first allocating module configured to, when the working channel label is greater than or equal to either a label of a prescribed channel or a label of a spare channel, increase the working channel label by a preset value repeatedly until an accumulated working channel label does not equal the label of the prescribed channel or the label of the spare channel, and to determine a channel corresponding to the accumulated working channel label as the working channel, the preset value being a difference between labels of neighboring working channels in a network of the apparatus, and
  - a second allocating module, the second allocating module configured to, when the working channel label is greater than or equal to both a label of a prescribed channel and a label of a spare channel, increase the working channel label by a twice of the preset value until an accumulated working channel label does not equal the label of the prescribed channel or the label of the spare channel, and to determine a channel corresponding to the accumulated working channel label as the working channel.

8. The apparatus according to claim 7, wherein the computing unit comprises a computing module, the computing module configured to compute the working channel label of the node according to (S+A) mod N, wherein S is the time parameter corresponding to the current superframe, A is the identifier of the node, and N is the number of working channels of the node in frequency hopping mode.

9. The apparatus according to claim 8, wherein the time parameter corresponding to the current superframe is a sequence number of the current superframe.

10. The apparatus according to claim 9, wherein the identifier of the node is a value of a network address of the node.

11. The apparatus according to claim 8, wherein the identifier of the node is a value of a network address of the node.

* * * * *